United States Patent Office 3,551,499
Patented Dec. 29, 1970

3,551,499
PROCESS OF PRODUCING ORGANIC SULFUR-CONTAINING COMPOUNDS
Ernst Wilhelm Krockow, Kleinkarlbach, Rheinpfalz, Germany, assignor to Dr. Spiess G.m.b.H., Kleinkarlbach, Rheinpfalz, Germany, a corporation of Germany
No Drawing. Continuation-in-part of application Ser. No. 371,188, May 29, 1964. This application July 26, 1966, Ser. No. 567,835
Claims priority, application Germany, June 5, 1963, S 85,539
Int. Cl. C07c 51/00, 149/00, 151/00
U.S. Cl. 260—607                        10 Claims

ABSTRACT OF THE DISCLOSURE

A process of exchanging one or more halogen atoms bound to a carbon atom in a halide whose halogen atom is selected from chlorine, bromine or iodine with a thiol or thiono group comprising reacting one mole of the halide with about one mole of an alkali metal or alkaline earth salt of trithiocarbonic acid for each halogen atom of the halide at a temperature not exceeding about 30° C. to form the monoester salt and splitting the monoester salt to produce the corresponding thio when there is one halogen attached to a single carbon or thiono when there are two halogens attached to a single carbon.

---

The present application is a continuation in part of copending application Ser. No. 371,188, filed May 29, 1964, and entitled "Method of Producing Organic Sulfur-Containing Compounds," now abandoned.

The invention relates to a novel and improved process of producing organic sulfur-containing compounds.

A known process of producing salts of the mono-alkyl ester of trithiocarbonic acid consists in linking salts of mercaptans to carbon disulfide. However, the mono-alkyl esters of trithiocarbonic acid which are obtainable from these salts by acidification are not stable and easily decompose into the corresponding thiol compounds and carbon disulfide.

It has also been proposed to produce the di-alkyl esters of trithiocarbonic acid by reacting one mole of an alkali salt of trithiocarbonic acid with two moles of an alkyl halide (Org. Synth., vol 39, pages 77–79).

It has now been found that, surprisingly, on reacting only one mole of an organic halogen-containing compound with one mole of an alkali metal trithiocarbonate, the reaction proceeds quantitatively to the mono-ester stage only.

The salts of trithiocarbonic acid mono-esters readily decompose into thiol compounds and carbon disulfide by the action of acids. Therefore, the reaction according to the present invention provides an elegant process of replacing an organically bound halogen atom by a thiol group.

Accordingly one object of the present invention is to provide a simple and effective process of producing organic sulfur-containing compounds.

Other objects of the present invention and advantageous features thereof will become apparent as the description proceeds.

In principle, the process according to the present invention comprises the steps of reacting a halogen-containing organic compound with a salt of trithiocarbonic acid in an amount sufficient to form the corresponding trithiocarbonic acid mono-ester of said organic compound and decomposing said mono-ester to form the desired sulfur-containing organic compound and carbon disulfide.

A noteworthy advantage of this process according to the present invention thus is that the carbon disulfide required for producing the starting trithiocarbonate is nearly quantitatively recovered, so that the method is also highly economical.

The reaction proceeds, for instance, according to the following equations:

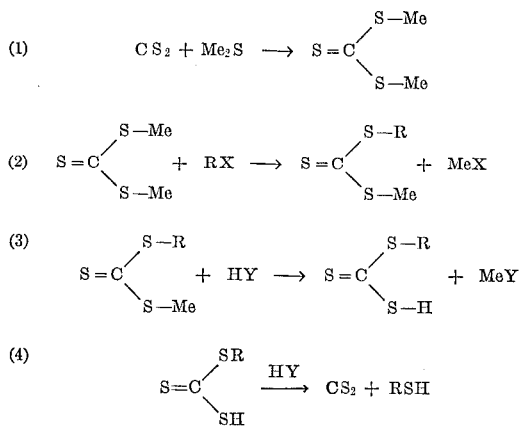

In these formulas: Me represents a metal or ammonium, X is halogen, Y is the anion of an acid, and R is an organic radical.

The method is generally applicable but, as it is to be expected, differences exist in the reactivity of the halides according to the nature of the halogen bond. Aliphatically bound halogen reacts quite easily releasing a considerable amount of heat, so that the reaction mixture must be cooled during the reaction, whereas aromatically bound halogen is most difficult to react. A reaction via the diazonium salt is also possible and proceeds with great violence.

If a starting compound contains two or more halogen atoms, all of them can usually be converted in this manner to thiol groups. If two or three halogen atoms are linked to a carbon atom, the corresponding thio-aldehydes or thio-acids, or their secondary conversion products are obtained.

The process is quite simple to perform. A solution of the halide is slowly added to the solution of a salt of trithiocarbonic acid, care being taken—usually by externally cooling—that the reaction mixture does not become too hot.

Suitable solvents are solvents or solvent mixtures which are inert to the reactants and reaction products and in which the reactants are partly soluble. Water or alcohols or mixtures thereof are preferred.

When using water as a solvent, it is best to use sufficient water to prevent precipitation of the salt which forms during acidification with hydrochloric acid so as to form a saturated salt solution. As has been found, this result is achieved when one liter of water is added for each one tenth to six moles and preferably for each three to four moles of sodium trithiocarbonate.

The reaction temperature is generally room temperature. However, it may be lower or higher depending on the different reactivity of the halides used as reactant and the volatility of the resulting thiol compounds.

When the reaction is complete, acid is added to the reaction mixture. Which acid is used, is immaterial. Generally speaking, any non-oxidizing acid is applicable. If the process is performed with great care, the mono-esters of trithiocarbonic acid can also be isolated at lower temperatures. The corresponding thiol compounds are obtained in a particularly pure form from the isolated mono-esters of the trithiocarbonic acid.

Carbon disulfide as required as one reactant for producing the trithiocarbonate is released on decomposition of the mono-esters of trithiocarbonic acid. It can be recovered in substantially quantitative amounts by distillation. It is often advisable to distill off the carbon disulfide at the same time as acidification is performed. The thiol compound can then be isolated by extraction and/or distillation. Halogenated hydrocarbons and ethers are particularly useful solvents for extraction. The yields of the resulting compounds are satisfactory and often amount to 95% of the theoretical yield.

The invention will now be illustrated by the following examples without, however, being limited thereto.

EXAMPLE 1

Ethyl mercaptan

A solution of 77 g. (½ mole) of sodium trithiocarbonate in 160 ml. of water is shaken in a shaker bottle with 54 g. (½ mole) of ethyl bromide for seven hours. After addition of ice, the reaction mixture is acidified with concentrated hydrochloric acid and heated on a steam bath. A mixture of ethyl mercaptan and carbon disulfide distills off between 35° C. and 45° C. The amount of ethyl mercaptan thus formed is determined by titration with an N/10 solution of iodine. Yield: 85% of the theoretical yield.

EXAMPLE 2 n-Butyl mercaptan 300 ml. of methanol are added to an aqueous solution of 154 g. (1 mole) of sodium trithiocarbonate in 400 ml. of water and a solution of 92.5 g. (1 mole) of n-butylchloride in 100 ml. of methanol is added dropwise thereto while stirring vigorously. As soon as the reaction is completed, the methanol is distilled off, the residue is acidified with concentrated hydrochloric acid, and the carbon disulfide thus formed is distilled off. The residue is extracted with ether and, after drying over calcium chloride, the ether is driven off and the resulting n-butyl mercaptan is distilled off. B.P.: 95–98° C. Yield: 81% of the theoretical yield.

The same yields are obtained with n-butylbromide.

EXAMPLE 3 n-Hexyl mercaptan

Proceeding as described in Example 2, but using, in place of n-butylbromide, an equimolecular amount of n-hexylbromide, produces n-hexyl mercaptan in a yield corresponding to 79% of the theoretical yield. B.P.: 64–67° C./30 mm. Hg.

EXAMPLE 4

Benzyl mercaptan

A solution of 154 g. (1 mole) of sodium trithiocarbonate in 350 ml. of water is mixed with 200 ml. of methanol. While this mixture is stirred and cooled with water, a solution of 126 g. (1 mole) of benxylchloride in 100 ml. of methanol is added dropwise thereto in the course of one hour, care being taken to keep the temperature between 15° C. and 20° C. After the reaction is completed, the mixture is acidified with hydrochloric acid and the carbon disulfide formed is distilled off. The residue is extracted with ether, the ether is driven off after drying over calcium chloride, and the resulting benzyl mercaptan is distilled off. B.P.: 76–78° C./12 mm. Hg. Yield: 85% of the theoretical yield.

EXAMPLE 5

Thioglycol

A solution of 616 g. (4 moles) of sodium trithiocarbonate in 2 liters of water is thoroughly mixed with 320 g. (4 moles) of ethylene chlorohydrin and the mixture is allowed to stand. During the first 30 minutes the temperature of the mixture increases rapidly from 10° C. to 23° C. After 12 hours the reaction mixture is acidified with dilute sulfuric acid, carbon disulfide is distilled off, and the residue is extracted with ether. After drying over calcium chloride, the ether is driven off and the resulting thioglycol is distilled off. B.P.: 67° C./15 mm. Hg. Yield: 84% of the theoretical yield.

EXAMPLE 6

Thioglycerol

A solution of 154 g. (1 mole) of sodium trithiocarbonate in 300 ml. of water is mixed with 110 g. (1 mole) of monochlorohydrin, whereby the temperature rises from 20° C. to 59° C. When the reaction subsides the solution is acidified with concentrated hydrochloric acid and the carbon disulfide formed thereby is distilled off by heating on a steam bath. 50 ml. of carbon disulfide are recovered. After neutralization with sodium hydroxide solution, the residue is extracted with butanol. The butanol is then driven off and the rremaining thioglycerol is distilled off. B.P.: 136–139° C./15 mm. Hg. Yield: 86% of the theoretical yield.

EXAMPLE 7

Thioglycollic acid 116.5 g. (1 mole) of solid sodium monochloro acetate are added portion by portion to a solution of 154 g. (1 mole) of sodium trithiocarbonate in 250 ml. of water while stirring continuously and thoroughly and cooling the mixture. When the reaction subsides, the reaction mixture is acidified with two moles of concentrated hydrochloric acid and the carbon disulfide formed thereby is distilled off. 75.7 g. of carbon disulfide, i.e. 94.5% of the quantity originally employed to form the sodium trithiocarbonate, are recovered. After the carbon disulfide has been distilled off, the amount of thioglycollic acid recovered is determined in the residue by titration with an N/10 solution of iodine. The total yield amounts to 92% of the theoretical yield.

EXAMPLE 8

Thioglycollic acid 1.165 kg. (10 moles) of sodium monochloro acetate are added portion by portion to a solution of 1,540 kg. (10 moles) of sodium trithiocarbonate in 2.5 liters of water while the mixture is stirred vigorously and cooled externally.

Upon completion of the reaction, the mixture is acidified with 20 moles of concentrated hydrochloric acid and the carbon disulfide formed thereby is distilled off on heating on a steam bath. 718 g., i.e. 90% of the theoretical amount are recovered. The residue is extracted with ether. The ether is evaporated and the thioglycollic acid is distilled off in a vacuum. B.P.: 94–96° C./6 mm. Hg. Yield: 85% of the theoretical yield.

103 g. of dithiodiglycollic acid still remain in the distillation residue. The yield of thioglycollic acid can further be increased by isolating this fraction and converting it by reduction.

If the reaction product of sodium trithiocarbonate and sodium monochloro acetate is stirred into a mixture of ice and concentrated hydrochloric acid, the mono-ester of the trithiocarbonate acid precipitates in the form of a yellow crystalline powder which is difficultly soluble in cold water and which can be isolated by careful filtration. At room temperature the mono-ester of trithiocarbonic acid slowly decomposes to carbon disulfide and thioglycollic acid which can thus be directly recovered in a particularly pure form.

If more than one mole of sodium monochloro acetate are used in the reaction of the trithiocarbonate solution and sodium chloro acetate, acidification with concentrated hydrochloric acid causes precipitation of the yellow, difficultly water-soluble thiocarbonyl bis-thioglycollic acid in quantities corresponding to the excess of sodium monochloro acetate.

Only a poor yield of thioglycollic acid can be obtained with great difficulty from said thiocarbonyl bis-thioglycollic acid.

EXAMPLE 9

Thioglycollic acid 58.3 g. (½ mole) of sodium monochloro acetate are added to an aqueous solution of 245.5 g. (1 mole) of barium trithiocarbonate in 500 ml. of water while stirring and cooling. At the end of the reaction the solution is acidified with concentrated hydrochloric acid and the carbon disulfide is distilled off on heating on a steam bath. The mixture is extracted with ether, the ethereal solution is dried over calcium chloride, and, after removal of the ether by evaporation, the thioglycollic acid is distilled in a vacuum. Yield: 91% of the theoretical yield.

EXAMPLE 10

Thioglycollic acid iso-octyl ester

A solution of 154 g. (1 mole) of sodium trithiocarbonate in 380 ml. of water is mixed with 200 ml. of methanol. A solution of 206 g. (1 mole) of iso-octyl chloro acetate in 100 ml. of methanol is added dropwise at 15° C. to this mixture while stirring and cooling with water. Thereby care is to be taken that the temperature does not rise beyond 20° C. Stirring is continued for another hour. The color of the solution changes from red to orange. Sodium chloride precipitates. The solution is then acidified with concentrated hydrochloric acid and the carbon disulfide thus formed is distilled off. The residue is extracted with ether which is distilled off from the extract after drying the same over calcium chloride. The resulting thioglycollic acid iso-octyl ester is distilled. B.P.: 106° C./4 mm. Hg. Yield: 79% of the theoretical yield.

EXAMPLE 11

Thiolactic acid 130.5 g. (1 mole) of sodium salt of α-chloro propionic acid are added to a solution of 154 g. (1 mole) of sodium trithiocarbonate in 340 ml. of water while the mixture is well stirred and cooled. After the reaction is completed, the reaction mixture is acidified with concentrated hydrochloric acid and the carbon disulfide formed thereby is distilled off on heating on a steam bath. The amount of thiolactic acid thus produced is determined by titration with an N/10 solution of iodine. Yield: 93.8% of the theoretical yield.

EXAMPLE 12

Thiobenzoic acid

A solution of 154 g. (1 mole) of sodium trithiocarbonate in 350 ml. of water is mixed with 300 ml. of methanol. In the course of half an hour, an amount of 140 g. (1 mole) of benzoyl chloride is added dropwise to this mixture which is well stirred and cooled, care being taken to prevent the temperature from rising beyond 20° C. After continued stirring for another half an hour, the methanol is distilled off on heating on a steam bath and the mixture is acidified with concentrated hydrochloric acid. The resulting carbon disulfide is then distilled off on heating on a steam bath. The residue is extracted with ether, the ether extract is washed with water and dried over calcium chloride. Thereafter, the ether is distilled off. The resulting thiobenzoic acid is distilled. B.P.: 98–100° C./11 mm. Hg. Yield: 77% of the theoretical yield.

Another distillation, 18 g. of dibenzoiyl disulfide resulting from the oxidation of the thiobenzoic acid during distillation remain as a crystalline residue. A further amount of 13% of thiobenzoic acid can be recovered from said residue. When carrying out the reaction under nitrogen to exclude the possibility of oxidation, the yield of thiobenzoic acid is about 91% of the theoretical yield.

When repeating the procedure according to Example 12 with 280 g. (2 moles instead of 1 mole) of benzoyl chloride, the addition of the excess benzoyl chloride exceeding 1 mole results in a further reaction accompanied by the separation of carbon disulfide. Processing of the reaction mixture does not yield the expected dibenzoyl compound of trithiocarbonic acid but thiobenzoic acid anhydride which can thus be recovered in nearly quantitative amounts.

EXAMPLE 13

Dimercapto ethane

A solution of 308 g. (2 moles) of sodium trithiocarbonate in 700 ml. of water is mixed with 700 ml. of methanol. While stirring and cooling the mixture, a solution of 99 g. (1 mole) of ethylene chloride in 400 ml. of methanol is added dropwise thereto. After the reaction is completed, the methanol is distilled off, the residue is acidified with concentrated hydrochloric acid, and the resulting carbon disulfide is distilled off. The residue is extracted with ether, and the ether after drying the extract over calcium chloride, is distilled off. A mixture of dimercapto ethane and ethylene trithiocarbonate remains which can be separated into the two compounds by distillation. Yield of dimercapto ethane: 38% of the theoretical yield. Yield of ethylene trithiocarbonate: 40% of the theoretical yield. Varying amounts of polymerized compounds are obtained.

EXAMPLE 14

Thioformaldehyde 85 g. (1 mole) of methylene chloride are added to a solution of 308 g. (2 moles) of sodium trithiocarbonate in 600 ml. of water. The reaction proceeds sluggishly and the stirred mixture must be heated to 40° C. under reflux for several days. During this time the mixture, by precipitation, turns into a nearly white amorphous mass which is separated and identified as an amorphous thioformaldehyde polymer.

EXAMPLE 15

Dimercapto methane

On repeating Example 14 with the addition of 400 ml. of methanol to the trithiocarbonate solution, the reaction is perceptibly exothermic. In addition to solid and liquid polymers of thioformaldehyde, dimercapto methane in

EXAMPLE 16

Thiobenzaldehyde

A solution of 308 g. (2 moles) of sodium trithiocarbonate in 660 ml. of water is mixed with 500 ml. of methanol and a solution of 161 g. (1 mole) of freshly distilled benzal chloride in 170 ml. of methanol is added dropwise thereto, while stirring. The temperature rises slightly. On allowing the reaction mixture to stand overnight, a large amount of a solid yellowish mass precipitates which represents a thiobenzaldehyde polymer.

EXAMPLE 17

Dithiobenzoic acid

A solution of 154 g. (1 mole) of sodium trithiocarbonate in 350 ml. of water is diluted with 350 ml. of methanol and heated to 35° C. A solution of 65 g. (⅓ mole) of benzotrichloride in 200 ml. of methanol is added dropwise to this mixture in the course of one hour, while stirring. Stirring is continued at 30° C.–35° C. for another three hours. The reaction mixture is then diluted with 1 liter of water and acidified with 100 ml. of concentrated hydrochloric acid diluted with 200 ml. of water. On extraction with ether, a deep violet-red ethereal solution of dithiobenzoic acid is obtained. After shaking said extract with alkali metal hydroxide solution, precipitation with lead acetate yields the brown lead salt of dithiobenzoic acid which is purified by recrystallization from toluene. Red, crystalline platelets. M.P.: 208° C.

EXAMPLE 18 n-Butylmercaptan

A solution of 308 g. (2 moles) of sodium trithiocarbonate in 330 ml. of water is mixed with 400 ml. of methanol. A solution of 184 g. (1 mole) of n-butyl iodide is added dropwise thereto at 25–28° C. within 30 minutes while stirring and cooling. Stirring is continued for two more hours.

A sample of the solution is titrated with N/10 iodine solution after acidification with 30% sulfuric acid and boiling to remove the hydrogen sulfide formed. The titration indicates a conversion of 89% of the theoretical amount.

The reaction solution is processed by acidification with 30% sulfuric acid and extraction with ether. The ether solution is separated and dried over sodium sulfate. After distilling off the ether, the resultant n-butyl mercaptan is distilled off. B.P.: 95–98° C./760 mm. Hg. Yield: 82% of the theoretical yield.

EXAMPLE 19

β,β'-Dimercapto di-ethyl ether

A solution of 154 g. (1 mole) of sodium trithiocarbonate in 330 ml. of water is mixed with 200 ml. of methanol. A solution of 71.5 g. (0.5 mole) of β,β'-dichloro di-ethyl ether in 50 ml. of methanol is added drop by drop to said mixture at 20–25° C. within 30 minutes while stirring and cooling. The mixture is allowed to stand for 48 hours. One ml. of the reaction solution is diluted with 20 ml. of water and acidified with 2–3 ml. of concentrated hydrochloric acid. To remove the hydrogen sulfide formed thereby, the mixture is boiled briefly and, after cooling, titrated with N/10 iodine solution. The titration indicates that 85% of β,β'-dimercapto di-ethyl ether are formed. The reaction solution is acidified with 100 ml. of concentrated hydrochloric acid, which results in the separation of an oil. The entire mixture is extracted with methylene chloride. The methylene chloride solution is separated and dried with sodium sulfate. The methylene chloride is distilled off and the residue is distilled in a vacuum. B.P.: 94° C./12 mm. Hg. The β,β'-dimercapto di-ethyl ether is obtained in an amount of 47.5 g. (69%) of the theoretical yield.

*Analysis.*—Found: 46.4% S; calculated: 46.4% S.

EXAMPLE 20

Allyl mercaptan

A solution of 308 g. (2 moles) of sodium trithiocarbonate in 660 ml. of water is mixed with 400 ml. of methanol. A solution of 153 g. (2 moles) of allyl chloride in 100 ml. of methanol is added drop by drop to said mixture at 25° C. within 30 minutes while stirring and cooling. Thereafter, the reaction solution is stirred for two more hours and is allowed to stand over night.

After removal of the neutral portions by extraction with ether, the solution is acidified with 200 ml. of concentrated hydrochloric acid. This results in the separation of a brown oil which is recovered.

The remaining solution is extracted with ether. The oil and the ether extracts are combined and repeatedly washed with water to remove the methanol. The ether solution is dried over sodium sulfate and the ether is distilled off. The residue is then distilled under atmospheric pressure.

B.P.: 66–67° C./760 mm. Hg. Yield of allyl mercaptan: 76.5 g. (51.7% of the theoretical yield).

EXAMPLE 21

1,4-dimercapto butane

A solution of 616 g. (4 moles) of sodium trithiocarbonate in 1320 ml. of water is mixed with 800 ml. of methanol. A solution of 254 g. (2 moles) of 1,4-dichloro butane in 200 ml. of methanol is added drop by drop to said mixture at 20° C. within two hours while stirring and cooling. Thereafter, stirring is continued at 28° C. for two more hours. One ml. of the reaction solution is mixed with 20 ml. of water, acidified with 2–3 ml. of concentrated hydrochloric acid, boiled for a short period of time to remove the hydrogen sulfide formed, and titrated with N/10 iodine solution. The titration indicates that 92.5% of 1,4-butane dithiol are produced.

The neutral portions are removed from the reaction solution by extraction with ether. The solution is then diluted with 5 liters of water and acidified with 400 ml. of concentrated hydrochloric acid while cooling with water at 15° C. This results in a vigorous evolution of hydrogen sulfide. The solution is then extracted with ether. The ether solution is separated and the ether is distilled off after de-acidification and drying. The residue is distilled. B.P.: 86° C./12 mm. Hg. 1,4-dimercapto butane is obtained in an amount of 106 g. (40.8% of the theoretical yield). A small amount of tetrahydrothiophene is formed as a by-product of the reaction.

EXAMPLE 22

Thioglycollic acid amide

A solution of 154 g. (1 mole) of sodium trithiocarbonate in 330 ml. of water is slowly mixed with 93.5 (1 mole) of chloro acetamide in powder form while stirring thoroughly. The temperature increases immediately markedly so that thorough external cooling is necessary to prevent the temperature from increasing to above 30° C. After one mole of chloro acetamide has been introduced, the dark yellow reaction solution remains completely clear. Care is to be taken that not more than one mole of chloro acetamide is introduced because otherwise a yellow precipitate of the trithiocarbonic acid ester will occur. A dark orange yellow, clear reaction solution of the mono-ester is obtained when proceeding as described.

After acidifying the reaction mixture with hydrochloric acid and boiling for a short period of time, its thioglycollic acid amide content is determined to be 81.8% in a sample of this solution by titration with a N/10 iodine solution.

Since thioglycollic acid amide is extremely sensitive to oxidation, it is not isolated from its solution but is directly converted into dithiodiglycollic acid amide. Thereby, 76% of carbon disulfide are recovered.

EXAMPLE 23

1,3-dimercapto propane

A solution of 308 g. (2 moles) of sodium trithiocarbonate in 660 ml. of water is mixed with 400 ml. of methanol. A solution of 202 g. (1 mole) of 1,3-dibromo propane in 100 ml. methanol is added drop by drop to said mixture at 25–28° C. within 2 hours while stirring and cooling. Stirring is continued at 28–30° C. for another 2 hours. One ml. of the reaction solution is mixed with 20 ml. of water, acidified with 2–3 ml. of concentrated hydrochloric acid, boiled for a short period of time to remove hydrogen sulfide formed thereby, and titrated with N/10 iodine solution after cooling. The titration indicates that slightly more than 75% of 1,3-dimercapto propane are formed.

The neutral portions are removed from the reaction solution by extraction with ether. The extracted solution is then acidified with about 200 ml. of concentrated hydrochloric acid and subsequently extracted with ether. The ether solution is separated and dried over calcium chloride. After distilling off the ether, the residue is distilled in a vacuum. B.P.: 66° C./12 mm. Hg. 1,3-dimercapto propane is obtained in an amount of 71 g. (65.7% of the theoretical yield).

EXAMPLE 24

1,3-dimercapto propane

The procedure of Example 23 is followed except that 113 g. (1 mole) of 1,3-dichloro propane are used as the starting material in place of 1,3-dibromo propane. Titration of the reaction solution indicates a conversion rate of 88.5%. Processing results in 87 g. of a 84% 1,3-dimercapto propane corresponding to a yield of 76% of the theoretical yield.

EXAMPLE 25

1,3-dimercapto propanol-2

A solution of 308 g. (2 moles) of sodium trithiocarbonate in 660 ml. of water is mixed with 400 ml. of ethanol. A solution of 129 g. (1 mole) of 1,3-dichloro propanol-2 in 100 ml. of ethanol is added drop by drop at 20° C. to said mixture within one hour while stirring and cooling. Cooling is discontinued and stirring of the solution is continued for five more hours. Thereby, the temperature rises to 26° C.

The reaction solution is allowed to stand over night. One ml. of the solution is diluted with 20 ml. of water and is acidified with dilute hydrochloric acid, briefly boiled to remove the hydrogen sulfide formed thereby, and titrated with N/10 iodine solution after cooling. The titration indicates a conversion rate of 88.7%.

The neutral portions are removed from the reaction solution by extraction with ether. The solution is then diluted with one liter of water, acidified with 200 ml. of concentrated hydrochloric acid, and subsequently extracted with ether. The ether solution is separated and de-acidified with sodium bicarbonate, subsequently washed with water, and dried over sodium sulfate. After distilling off the ether, the residue is distilled. B.P. 97–98° C./12 mm. Hg. 1,3-dimercapto propanol-2 is obtained in an amount of 83 g. (61.6% of the theoretical yield).

*Analysis.*—Found: 51.9% S; calculated: 51.6% S.

EXAMPLE 26

1,4-dimercapto butene-2

A solution of 308 g. (2 moles) of sodium trithiocarbonate in 660 ml. of water is mixed with 400 ml. of methanol. A solution of 125 g. (1 mole) of 1,4-dichloro butene-2 in 100 ml. of methanol is added drop by drop at 20–25° C. to said mixture within one hour while stirring and cooling. Stirring is continued at 20–25° C. for four more hours. The reaction mixture contains a large amount of a yellow, solid polymer which is separated by filtration. The neutral portions are removed from the turbid, aqueous filtrate by extraction with ether. The solution is then diluted with 500 ml. of water and acidified with 400 ml. of a mixture of hydrochloric acid and water (1:1). Thereafter, the solution is extracted with ether. The ether solution is subjected to three washings with water and dried. The ether is distilled off and the residue is distilled. B.P.: 82–84° C./12 mm. Hg. 1,4-dimercapto butene-2 is obtained in an amount of 42 g.

EXAMPLE 27

Thiobenzoic acid 281 g. (2 moles) of benzoyl chloride are added drop by drop at 20–23° C. to a solution of 308 g. (2 moles) of sodium trithiocarbonate in 660 ml. of water within one hour while stirring and cooling. Thereafter, stirring is continued at 20–23° C. for 1.5 hours. Thereby two layers are formed. The lower layer is separated and yields 75 ml. of carbon disulfide (62% of the theoretical yield). The upper layer still contains carbon disulfide in finely divided form.

The residual carbon disulfide and the neutral portions present are removed from the upper layer by extraction with ether. Processing of the ether solution shows that it contains about 10 g. of neutral portions which are identified as being substantially dibenzoyl disulfide.

The separated aqueous solution obtained after extraction with ether contains the sodium salt of thiobenzoic acid which may be isolated therefrom in a known manner and may directly be used for further reactions. Thus, for instance, methylation of this solution with 2 moles of dimethyl sulfate gives 264 g. of thiobenzoic acid methyl ester (87% of the theoretical yield) having a boiling point of 110–111° C./12 mm. Hg.

Reaction of the resultant aqueous solution of the sodium salt of thiobenzoic acid with 2 moles of the pulverulent sodium salt of chloro acetic acid while stirring and cooling yields 391 g. of S-benzoyl thioglycollic acid.

EXAMPLE 28

Thio acetic acid 78.5 g. (1 mole) of acetylchloride are added drop by drop at −20° C. to a solution of 154 g. of sodium trithiocarbonate in 330 ml. of water within one hour while stirring and cooling. Stirring is continued at −20° C. for 1.5 hours.

The main portion (80% of the theoretical yield) of carbon disulfide formed thereby separates as a lower layer and is removed. The residual amount of carbon disulfide is recovered from the upper layer by extraction with ether.

The remaining solution is acidified with 100 ml. of concentrated hydrochloric acid and thereafter extracted with ether. The ether solution is dried over sodium sulfate and the ether is distilled off. The residue is distilled in a Vigreux column. Thiol acetic acid is obtained in an amount of 44 g. Its boiling point is 87–89° C.

In place of the sodium and barium salts of trithiocarbonic acid, there may be employed other metal salts of said acid, such as other alkali metal salts, for instance, the potassium, lithium, and the like salts, other alkaline earth metal salts, for instance, the calcium, strontium, magnesium salts, and other water- or solvent-soluble metal salts, such as the copper while otherwise the procedure is the same as described hereinabove. The preferred salts, however, are the alkali metal and alkaline earth metal salts of trithiocarbonic acid.

In place of the organic halide compounds used as the other reactant in the preceding examples, there may be employed other organic halides while otherwise the procedure is the same as described hereinabove. Such other organic halides are, for instance, the following compounds which yield the respective sulfur-containing compounds in a good yield:

| Example | Organic halide | Sulfur-containing compound |
|---|---|---|
| 29 | Methyl chloride | Methyl mercaptan. |
| 30 | Isopropyl bromide | Isopropyl mercaptan. |
| 31 | Cetyl bromide | Cetyl mercaptan. |
| 32 | Myricyl chloride | Myricyl mercaptan. |
| 33 | Bromo cyclopentane | Cyclopentyl mercaptan. |
| 34 | Chloro cyclohexane | Cyclohexyl mercaptan. |
| 35 | Cyclohexyl methylbromide | Cyclohexyl methyl mercaptan. |
| 36 | β-Cyclohexyl ethyl bromide | β-Cyclohexyl ethyl mercaptan. |
| 37 | Iodo benzene | Thiophenol. |
| 38 | Ethyl β-Bromopropionate | Ethyl β-mercaptopropionate. |
| 39 | 2-Furfuryl chloride | 2-Furfuryl mercaptan. |
| 40 | β-Phenyl ethyl bromide | β-Phenyl ethyl mercaptan. |
| 41 | 4-Bromo-1-isopropyl benzene | p-Isopropyl thiophenol. |
| 42 | 2-Furoic acid chloride | 2-Thiolfuroic acid. |
| 43 | α-Bromo lauric acid | α-Mercapto lauric acid. |
| 44 | Hexamethylene chloride | 1,6-Dimercapto hexane. |
| 45 | Monobromo acetone | Mercapto acetone. |
| 46 | Palmitic acid chloride | Thiolpalmitic acid. |
| 47 | 2-Chloro pyridine | 2-Pyridinethiol. |
| 48 | Nicotinic acid chloride | Thiolnicotinic acid. |
| 49 | 2-Chloro quinoline | 2-Quinoline thiol. |
| 50 | 6,8-Dibromo octanoic acid ethyl ester. | 6,8-Dimercapto octanoic acid ethyl ester. |
| 51 | 2-Chloro naphthalene | β-Thionaphthol. |
| 52 | o-Bromo benzoic acid | Thiosalicylic acid. |

Of course, as stated hereinabove, many changes and variations in the starting organic halogeno compounds, the salts of trithiocarbonic acid, the solvents, the reaction conditions, temperature, and duration, the conditions for splitting up the trithiocarbonic acid ester compounds, the splitting acid, the splitting temperature and duration, the manner in which the reaction mixtures are worked up and purified, and the like may be made by those skilled in the art in accordance with the principles set forth herein and in the claims annexed hereto.

I claim:

1. A process of exchanging one or more halogen atoms bound to a carbon atom in a halide whose halogen atom is selected from chlorine, bromine or iodine with a thiol or thiono group comprising reacting one mole of the halide with about one mole of an alkali metal or alkaline earth salt of trithiocarbonic acid for each halogen atom of the halide at a temperature not exceeding about 30° C. to form the monoester salt and splitting the monoester salt to produce the corresponding thiol when there is one halogen attached to a single carbon or thiono when there are two halogens attached to a single carbon.

2. In a process of exchanging one or more halogen atoms bound to a carbon atom in an organic halide whose halogen atom is selected from chlorine, bromine or iodine, with a thiol or thiono group, the step of reacting one mole of the halide with about one mole of an alkali metal or alkaline earth salt of trithiocarbonic acid for each halogen atom of the halide at a temperature not exceeding 30° C. to form the monoester salt, the latter being adapted for splitting to form the ulimate sulfur-containing compound.

3. The process according to claim 1, wherein splitting is effected by means of a non-oxidizing acid.

4. The process according to claim 1, wherein the halide is a halide which carries two halogen atoms at one carbon atom.

5. The process of claim 4 in which the halide is benzal pound.

6. The process of claim 4 in which the halide is methylene chloride.

7. The process according to claim 4, wherein splitting of the resulting ester compound is effected by means of a non-oxidizing acid.

8. The process according to claim 1, wherein reaction of the halide and the salt of trithiocarbonic acid is effected in the presence of an inert solvent.

9. The process according to claim 8, wherein the inert solvent is water.

10. The process according to claim 8, wherein the inert solvent is an aqueous lower alkanol.

References Cited

Campaigne, "Chem. Reviews," vol. 39, p. 9 (1946).

Reid, "Chem. Bivalent Sulfur," vol. 1, pp. 30–31 (1958).

Reid, "Chem. Bivalent Sulfur," vol. 4, pp. 173–4 (1962).

Runge et al.: "Chem Abstracts," vol. 54 (1960) 20945.

CHARLES B. PARKER, Primary Examiner

D. R. PHILLIPS, Assistant Examiner

U.S. Cl. X.R.

260—79, 283, 294.8, 327, 347.2, 399, 455, 470, 481, 515, 526, 593, 609, 614, 632